(12) United States Patent
Jang et al.

(10) Patent No.: US 8,958,619 B2
(45) Date of Patent: Feb. 17, 2015

(54) METHOD OF RECONSTRUCTING TOMOGRAMS FROM POLYCHROMATIC X-RAY TRANSMISSION IMAGE AND IMAGE PROCESSING APPARATUS USING THE SAME

(75) Inventors: Kwang-eun Jang, Busan (KR);
Young-hun Sung, Hwaseong-si (KR);
Jong-ha Lee, Hwaseong-si (KR);
Kang-eui Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 182 days.

(21) Appl. No.: 13/553,033

(22) Filed: Jul. 19, 2012

(65) Prior Publication Data

US 2013/0182927 A1 Jul. 18, 2013

(30) Foreign Application Priority Data

Jul. 22, 2011 (KR) .................. 10-2011-0073246

(51) Int. Cl.
*G06K 9/00* (2006.01)
*G06T 11/00* (2006.01)

(52) U.S. Cl.
CPC .............. *G06T 11/005* (2013.01); *G06T 11/006* (2013.01); *G06T 2211/436* (2013.01)
USPC .......................................... 382/131; 382/132

(58) Field of Classification Search
CPC ............ G06T 11/005; G06T 2211/421; G06T 2211/424; G06T 11/003; G06T 11/008; G06T 2207/10081; G06T 2211/416; G06T 7/0012; G06T 7/0024; A61B 6/032; G01N 23/046
USPC ......................................................... 382/131
See application file for complete search history.

(56) References Cited

U.S. PATENT DOCUMENTS

| 2007/0140410 A1 | 6/2007 | Van Stevendaal et al. |
| 2009/0310736 A1 | 12/2009 | Ziegler et al. |
| 2011/0262054 A1 * | 10/2011 | Benson et al. ............... 382/275 |

FOREIGN PATENT DOCUMENTS

| KR | 10-2009-0007999 | 1/2009 |
| KR | 10-2010-0067326 | 6/2010 |

OTHER PUBLICATIONS

Schneider et al. "Coherent Scatter Computer Tomography Applying a Fan-Beam Geometry," Medical Imaging 2001: Physics of Medical Imaging, Proceedings of SPIE, vol. 4320, 2001.*
Srivastava, "Accelerated Statistical Image Reconstruction Algorithms and Simplified Cost Functions for X-Ray Computed Tomography," The University of Michigan, 2008.*
European Search Report mailed Sep. 19, 2013 in corresponding European Application No. 12177246.1.

(Continued)

*Primary Examiner* — Amir Alavi
*Assistant Examiner* — Kenny Cese
(74) *Attorney, Agent, or Firm* — Staas & Halsey LLP (57) ABSTRACT

A method of reconstructing tomograms from a polychromatic X-ray transmission image and an image processing apparatus using the same. An image of a target is reconstructed in consideration of a fact that an X-ray has a polychromatic X-ray spectrum and the target is dependent upon energy of the X-ray transmitted through the target, and thus an image without any beam hardening artifacts may be generated. In addition, measurement data for X-rays with respect to all wavelengths is used to reconstruct an image, thereby reconstructing an accurate image.

21 Claims, 5 Drawing Sheets

(56) References Cited

OTHER PUBLICATIONS

Chung et al., "Numerical Algorithms for Polyenergetic Digital Breast Tomosynthesis Reconstruction," Society for Industrial and Applied Mathematics, SIAM J. Imaging Sciences, vol. 3, No. 1, 2010, pp. 133-152.

Korean Office Action issued Apr. 23, 2014 in corresponding Korean Patent Application 10-2011-0073246.

\* cited by examiner

METHOD OF RECONSTRUCTING TOMOGRAMS FROM POLYCHROMATIC X-RAY TRANSMISSION IMAGE AND IMAGE PROCESSING APPARATUS USING THE SAME

CROSS-REFERENCE TO RELATED APPLICATIONS

This application claims the priority benefit of Korean Patent Application No. 10-2011-0073246, filed on Jul. 22, 2011, in the Korean Intellectual Property Office, the disclosure of which is incorporated herein in its entirety by reference.

BACKGROUND

1. Field

Embodiments of the present disclosure relate to methods of reconstructing tomograms from a polychromatic X-ray transmission image and image processing apparatuses using the methods, and more particularly, to methods of reconstructing tomograms by radiating polychromatic X-rays to a target and detecting polychromatic X-rays transmitted through the target and image processing apparatuses using the methods.

2. Description of the Related Art

X-ray tomography is used for testing tissue of diagnostic targets. Computed tomography (CT) involves acquiring a plurality of tomograms of a target by scanning with X-rays around the target at about 180 degrees, and reconstructing the tomograms to generate an image representing the target. Tomosynthesis involves acquiring a plurality of tomograms of a target by scanning it with X-rays within a limited range of angles relative to CT, and reconstructing the tomograms to generate an image representing the target.

X-ray transmission image data is acquired by detecting X-rays transmitted through a target and tomograms of a target are reconstructed from the X-ray transmission image data. When tomograms indicating a target are reconstructed, it is assumed that X-rays are monochromatic and a target is not affected by photonic energy of X-rays transmitted through the target. However, in reality, X-rays have a polychromatic spectrum and materials of a target are affected by X-ray energy when the X-rays are transmitted through the target. Thus, the assumptions used to reconstruct tomograms do not properly reflect a practical situation.

SUMMARY

According to one or more embodiments, methods of reconstructing tomograms indicating a target by detecting polychromatic X-rays transmitted through the target are provided.

According to one or more embodiments, computer readable recording media having recorded thereon a program for executing the methods are provided.

According to one or more embodiments, image processing apparatuses for reconstructing tomograms are provided.

Additional aspects will be set forth in part in the description which follows and, in part, will be apparent from the description, or may be learned by practice of the presented embodiments.

According to an aspect of the present disclosure, a method of reconstructing tomograms, in which at least one X-ray spectrum is radiated to a target including at least one material to reconstruct the tomograms of the target from an X-ray transmitted through the target is provided. The method includes receiving transmission image data that is measured by detecting the X-ray transmitted through the target; obtaining reconstruction information of the target from transmission image data in consideration of a fact that the X-ray has a polychromatic X-ray spectrum; and generating the tomograms of the target from the obtained reconstruction information.

According to another aspect of the present disclosure, a computer readable recording medium having recorded thereon a program for executing the above-described method.

According to another aspect of the present disclosure, an apparatus for processing an image, in which at least one X-ray spectrum is radiated to a target including at least one material to reconstruct the tomograms of the target from an X-ray transmitted through the target, is provided. The apparatus includes an input unit for receiving transmission image data that is measured by detecting the X-ray transmitted through the target; an image processor for obtaining reconstruction information of the target from transmission image data in consideration of a fact that the X-ray has a polychromatic X-ray spectrum and for generating the tomograms of the target from the obtained reconstruction information; and an output unit for outputting the tomograms to an image display apparatus connected to the apparatus.

According to another aspect of the present disclosure, a method of reconstructing tomograms, in which at least one X-ray spectrum is radiated through a target comprising at least one material, is provided. The method includes receiving transmission image data that is measured by detecting the X-ray spectrum radiated through the target and obtaining a cost function of the transmission image data by decoupling an integral of energies of the at least one X-ray spectrum and a line integral of a path along which photons of the at least one X-ray spectrum are radiated, minimizing the cost function having the decoupled form in order to calculate reconstruction information of the target, and constructing the tomograms of the target using the calculated reconstruction information.

According to another aspect of the present disclosure, an apparatus of reconstructing tomograms, in which at least one X-ray spectrum is radiated through a target comprising at least one material, is provided. The apparatus includes an input unit to receive transmission image data that is measured by detecting the X-ray spectrum radiated through the target, an image processor to obtain a cost function of the transmission image data by decoupling an integral of energies of the at least one X-ray spectrum and a line integral of a path along which photons of the at least one X-ray spectrum are radiated, to minimize the cost function having the decoupled form in order to calculate reconstruction information of the target, and to reconstruct the tomograms of the target using the calculated reconstruction information, and an output unit to output the tomograms to an image display apparatus.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The following embodiments relate to a method of reconstructing tomograms from a polychromatic X-ray transmission image. Those matters well known to one of ordinary skill in the art will not be described in detail.

Figure 1:
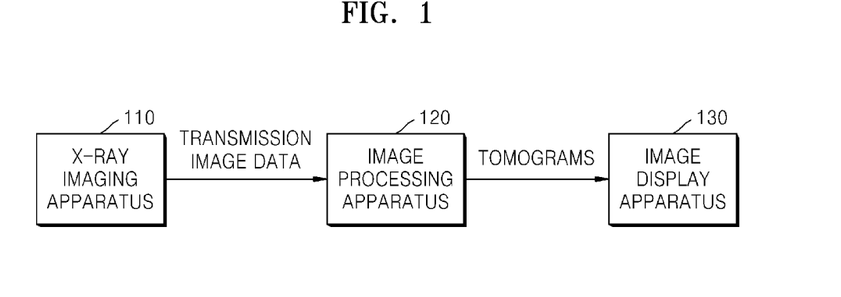
FIG. 1 is a schematic diagram of an X-ray imaging system according to one or more embodiments.

FIG. 1 is a schematic diagram of an X-ray imaging system according to one or more embodiments. The X-ray imaging system of FIG. 1 may include, for example, an X-ray imaging apparatus 110, an image processing apparatus 120, and an image display apparatus 130.

The X-ray imaging apparatus 110 may include an X-ray radiation unit (not shown) and an X-ray detection unit (not shown). The X-ray radiation unit may radiate X-rays onto a target that is a diagnostic target. The target may be a part of a body, and in some embodiments, may be a breast or chest. The X-ray detection unit may detect an X-ray that has passed through the target and generate an electric signal from the detected X-ray. Upon receiving an external instruction from a doctor or a medical expert, the X-ray radiation unit may radiate an X-ray toward the target, while the X-ray detection unit may detect the radiated X-ray and generate an electric signal from the detected X-ray. The electric signal is converted into digital data.

Figure 2:
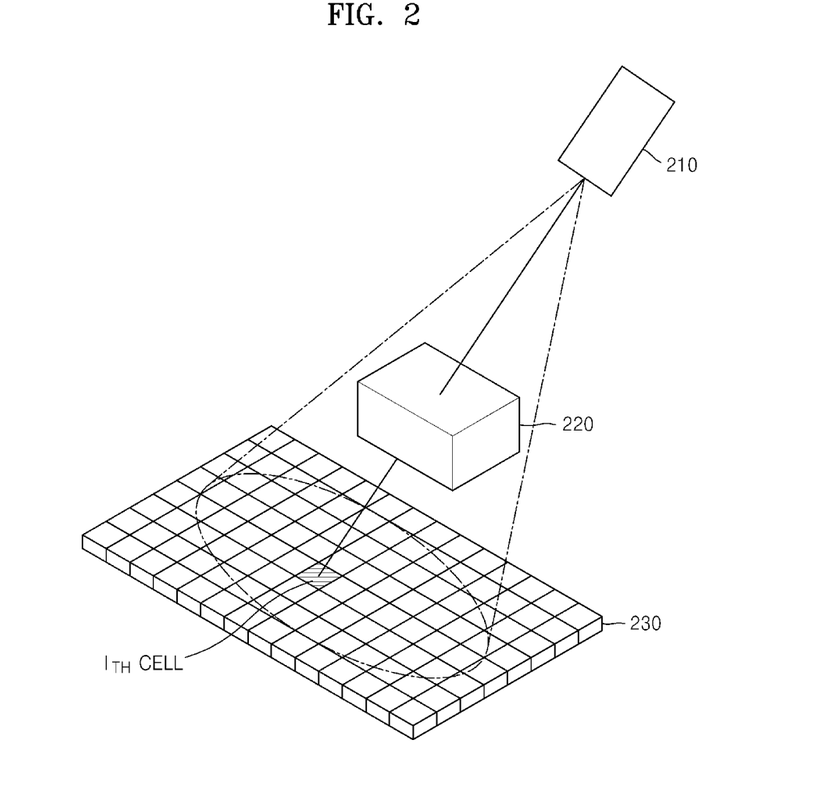
FIG. 2 is a diagram illustrating that X-rays radiated towards a target are transmitted to an X-ray detection unit through a target.

FIG. 2 is a diagram illustrating that X-rays radiated towards a target 220 are transmitted to an X-ray detection unit 230 through the target 220. Hereinafter, with reference to FIG. 2, a method performed by the X-ray detection unit 230 that measures transmission image data by detecting X-rays transmitted through the target 220 will be described. X-rays are radiated from an X-ray radiation unit 210 towards the target 220 and may have, but are not limited to, a cone-beam shape. Only X-rays that are transmitted through the target 220 reach the X-ray detection unit 230. The X-ray detection unit 230 may be divided into cells having a predetermined size, as shown in FIG. 2. The target 220 is positioned on a path along which the X-rays are radiated between the X-ray radiation unit 210 and a predetermined cell of the X-ray detection unit 230. X-rays have characteristics whereby X-rays are attenuated while being transmitted through the target 220. Thus, by measuring the amount of X-rays that reach a predetermined cell of the X-ray detection unit 230, a degree of attenuation of the X-rays by the target 220 may be obtained, and accordingly information about the inside of the target 220 may be obtained.

Figure 3:
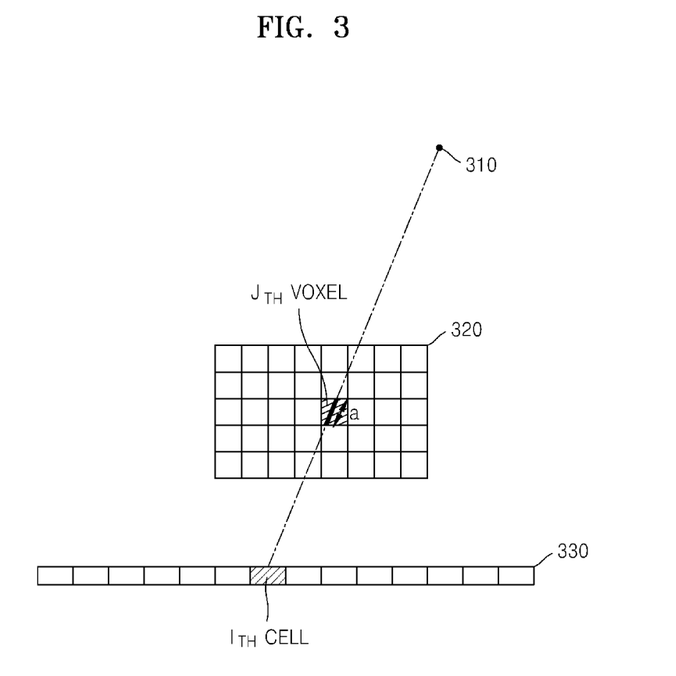
FIG. 3 is a side cross-sectional view illustrating that X-rays radiated towards a target are transmitted to an X-ray detection unit through the target.

FIG. 3 is a side cross-sectional view illustrating that X-rays radiated towards a target 320 are transmitted to an X-ray detection unit 330 through the target 320. In FIG. 3, the target 320 is divided into a plurality of voxels. The target 320 may have a three-dimensional (3D) shape and may be composed of at least one material. If the target 320 has a hexahedral shape, a side sectional view of the target 320 has a rectangular shape as shown in FIG. 3. If the target 320 having a 3D shape is divided into unit regions (hereinafter, referred to as voxels) with a predetermined size, a sectional view of the target 320 may also have a rectangular shape with a predetermined size. One or more X-rays having different wavelengths may be transmitted through a single voxel and the X-rays may be transmitted through the voxel along different paths. The voxels may be formed of different materials. FIG. 3 shows a line as a single X-ray with a predetermined wavelength from among X-rays that are radiated from an X-ray source 310 and reach an $i_{th}$ cell of the X-ray detection unit 330 and further shows that the X-ray is transmitted through a $j_{th}$ voxel of the X-ray detection unit 330, which is positioned on a path along which the X-ray is radiated, by as much as a distance 'a'. The X-ray detection unit 330 measures transmission image data for each respective cell by detecting polychromatic X-rays that are transmitted through a plurality of voxels of the target 320 and reach cells of the X-ray detection unit 330. The measured transmission image data may be transmitted to the image processing apparatus 120.

The image processing apparatus 120 receives the measured transmission image data from the X-ray imaging apparatus 110. The image processing apparatus 120 may reconstruct tomograms by using the transmission image data to generate an image indicating a target. The image indicating the target may be a tomogram indicating a sectional view of the target.

Transmission image data may be modeled in a complex form that is obtained by coupling an integral of energies of X-rays having respective wavelengths constituting a spectrum and a line integral of a path along which photons of X-rays are transmitted. Transmission image data measured in an $i_{th}$ cell of an X-ray detection unit may be modeled according to Equation 1 below.

$$y_i = \int S_i(\epsilon) \exp(-\int \rho(x,y,z,\epsilon)dl)d\epsilon \qquad (1)$$

In Equation 1, i denotes an index of a unit cell of the X-ray detection unit, $y_i$ denotes transmission image data, $S_i(\epsilon)$ denotes an intensity of an X-ray having a predetermined wavelength in the X-ray spectrum, $\rho(x, y, z, \epsilon)$ denotes an attenuation coefficient of a target at a predetermined position, and $\int (\cdot)dl$ denotes a line integral of a path between an X-ray source and the $i_{th}$ cell of the X-ray detection unit. The outermost integral in Equation 1 means an integral of all wavelength regions in the X-ray spectrum, that is, an integral of all energy regions in the X-ray spectrum, and is performed when an X-ray has a polychromatic X-ray spectrum.

Typically, in X-ray tomography, when tomograms indicating a target are reconstructed, it is assumed that X-rays are monochromatic and the target is not affected by photonic energy of X-rays transmitted through the target, and data modeling is performed based on this assumption. In this case, the tomograms are reconstructed by simplifying the modeled data. Such a typical method is referred to as monochromatic approximation. Transmission image data used in the monochromatic approximation is defined according to Equation 2 below.

$$y_i \approx S_i(\epsilon_0) \exp(-\int \rho(x,y,z)dl) \qquad (2)$$

Comparing Equation 2 with Equation 1, in Equation 2, an attenuation coefficient is $\rho_c(x,y,z)$ that is obtained by removing a parameter related to X-ray energy from the attenuation coefficient of Equation 1. Thus, it may be seen that the transmission image data is not affected by X-ray energy. In addition, Equation 2 is obtained by removing the integral of X-ray energies of Equation 1. Thus, it may be seen that the transmission image data is related to a single wavelength, that is, a single energy region in a spectrum. In such a monochromatic approximation, transmission image data may be modeled by decoupling an integral of the outermost energy and line integral of a path along which photons of X-rays are transmitted and tomograms may be reconstructed by using a simple method such as filtered back projection.

However, in reality, X-rays have a polychromatic spectrum and the attenuation characteristics of materials of a target are affected by (i.e., are dependent on) energies of photons of X-rays that are transmitted through a target. Thus, when tomograms are reconstructed using a monochromatic approximation that does not reflect an actual situation, beam hardening artifacts may occur and unique functions of a device, such as material separation, may not be properly performed in a system that actually includes a plurality of X-ray spectrums.

According to one or more embodiments, instead of using such a monochromatic approximation, tomograms indicating a target are reconstructed from transmission image data that is modeled in a complex form that is obtained by coupling an integral of energies of X-rays having respective wavelengths constituting a spectrum and a line integral of a path along which photons of X-rays are transmitted.

The image display apparatus 130 may receive and display the tomograms generated by the image processing apparatus 120.

Figure 4:
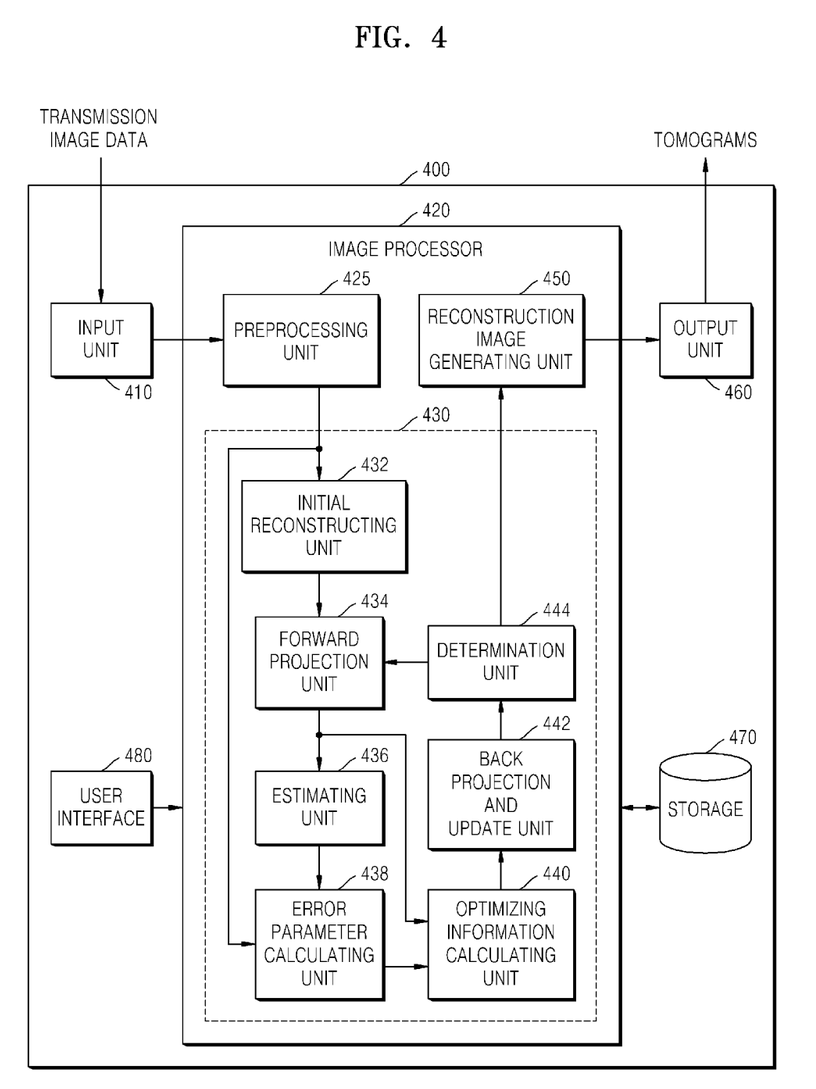
FIG. 4 is a block diagram of an image processing apparatus according to one or more embodiments.

FIG. 4 is a block diagram of an image processing apparatus 400 according to one or more embodiments. The image processing apparatus 400 may include, for example, an input unit 410, an image processor 420, an output unit 460, a storage 470, and a user interface 480.

The input unit 410 receives the transmission image data measured by the X-ray imaging apparatus 110. That is, the input unit 410 functions as an interface between the outside and the image processing apparatus 400. The received transmission image data is transmitted to the image processor 420.

The image processor 420 receives and processes the transmission image data that is input to the input unit 410 to generate tomograms of a target. Referring to FIG. 4, the image processor 420 may include, for example, a preprocessing unit 425, a reconstructing unit 430, and a reconstruction image generating unit 450. The reconstructing unit 430 may include, for example, an initial reconstructing unit 432, a forward projection unit 434, an estimating unit 436, an error parameter calculating unit 438, an optimizing information calculating unit 440, a back projection and update unit 442, and a determination unit 444. The image processor 420 may be manufactured as unique hardware, e.g., chips, for performing functions of such components, or may be embodied by using a central processing unit (CPU) and a unique program stored in storage 470.

The preprocessing unit 425 may perform a basic process for removing noise on the transmission image data that is transmitted from the input unit 410, or may perform processing such as calibration or correction on the transmission image data. The transmission image data on which the basic process is performed by the preprocessing unit 425 is transmitted to the initial reconstructing unit 432.

The initial reconstructing unit 432 performs an initial reconstructing process using the transmission image data. Reconstruction information for generating tomograms indicating the target may be acquired from the transmission image data on which the initial reconstructing process is performed. In this case, the term reconstruction information may refer to information regarding a reconstruction space of the target, which is used to reconstruct the tomograms indicating the target and may be a density value of a material of the target at a predetermined position, that is, a predetermined voxel of the target. In order to obtain the reconstruction information, the initial reconstructing unit 432 may use filtered back projection that is well known to those of ordinary skill in the art. When the target includes a plurality of materials, the reconstruction information may be obtained using another method of acquiring reconstruction information from transmission image data that is measured using a plurality of X-ray spectrums. An example of this method is a method disclosed in "A quantitative theory of the Hounsfield unit and its application to dual energy scanning" (written by R. A. Brooks, Journal of Computer Assisted Tomography, Vol. 1, No. 4, pp. 487-493) that was published in 1977.

The forward projection unit 434 performs forward projection on the reconstruction information. The forward projection unit 434 may perform the forward projection on initial reconstruction information or on updated reconstruction information. The initial reconstruction information is reconstruction information that is reconstructed from the transmission image data measured by the initial reconstructing unit 432. The updated transmission image data is reconstruction information on which at least one reconstruction process has been performed by the reconstructing unit 430. The forward projection is performed in order to consider paths along which X-rays are transmitted through a target when a polychromatic X-ray spectrum is radiated to the target that is recognized based on the reconstruction information. Thus, a line integral parameter related to the reconstruction information may be calculated in consideration of the paths along which X-rays are transmitted.

The estimating unit 436 simulates a case in which an X-ray of a polychromatic spectrum is radiated to the target that is recognized from the reconstruction information to estimate the transmission image data. The transmission image data may be obtained by using the line integral parameter related to the reconstruction information calculated by the forward projection unit 434 in an equation obtained by modeling the transmission image data.

The error parameter calculating unit 438 may receive both the transmission image data estimated by the estimating unit 436 and the measured transmission image data input to the initial reconstructing unit 432. An error parameter having a predetermined form is generated using the measured transmission image data and the estimated transmission image data. The predetermined form may be a ratio of the estimated transmission image data to the measured transmission image data or a reciprocal of the ratio, that is, a ratio of the measured transmission image data to the estimated transmission image data.

The optimizing information calculating unit 440 calculates optimization information used to obtain the reconstruction information. According to the present embodiment, an algorithm for reconstructing an image may be a predefined cost function for recognizing the reconstruction information. Lastly, the reconstruction information for minimizing the cost function may be obtained. The cost function is used since an equation obtained by modeling transmission image data including reconstruction information has a complex form obtained by coupling an energy integral and a line integral. Thus, it is very difficult to obtain the reconstruction information directly from the equation and there has thus far been no analytic solution to solve this problem.

The cost function regarding transmission image data may be defined by introducing a generalized information theoretic discrepancy (GID) concept and reconstruction information closest to the correct reconstruction information is obtained by minimizing the cost function. In particular, a surrogate function obtained by decoupling an energy integral and a line integral may be obtained by setting two appropriate hypothetical parameters, redefining the cost function in the form of a double minimization related to the two hypothetical parameters, and performing an alternating minimization method related to the two hypothetical parameters on the redefined cost function. That is, the surrogate function having a decoupled form is minimized, instead of directly minimizing the cost function obtained by coupling the two integrals. In this case, if a Hessian matrix and gradient related to a line integral parameter of the cost function are obtained in order to obtain a reconstruction information value for minimizing the minimized surrogate function, new reconstruction information may be obtained. Thus, the optimizing information calculating unit 440 may calculate the Hessian matrix and the gradient vector related to line integral parameters of the cost function. The Hessian matrix and the gradient vector related to line integral parameters of the cost function may correspond to the optimization information used to obtain the reconstruction information.

The back projection and update unit 442 obtains the new reconstruction information by using the Hessian matrix and the gradient vector related to line integral parameters, which is calculated by the optimizing information calculating unit 440. A new vector (hereinafter, referred to as the "vector A") may be generated by back projecting elements of the gradient vector and a new matrix (hereinafter, referred to as the "matrix B") may be generated by back projecting elements of the Hessian matrix. Then, the new reconstruction information may be obtained by calculating a linear summation of the previous reconstruction information and a value obtained by the product of an inverse matrix of the matrix B and the vector A. The generated new reconstruction information may be updated instead of the previous reconstruction information.

The determination unit 444 may determine whether a process for obtaining the new reconstruction information is further performed. According to the present embodiment, since the new reconstruction information is generated by continuing to update the previous reconstruction information in order to be close to the correct reconstruction information, the determination unit 444 determines whether a reconstructing process is finished. For example, when a repeat number of the reconstructing process is previously determined, the reconstruction information is updated by as much as the repeat number, or when an information amount difference between the updated reconstruction information and the previous reconstruction information is a predetermined threshold value or less, it may be determined that updating of the reconstruction information is not necessary and the reconstruction process may be finished.

When the determination unit 444 determines that the reconstruction process will no longer be performed, the reconstruction image generating unit 450 generates images indicating the target, that is, tomograms indicating sectional views indicating the target using the lastly updated reconstruction information.

The output unit 460 receives the tomograms generated by the reconstruction image generating unit 450 and may output the tomograms on the image display apparatus 130 for displaying tomograms.

The storage 470 is connected to the image processor 420 and stores data values required in the image processor 420 or data values generated by the image processor 420. For example, the storage 470 may store information regarding a predetermined equation used in the image processor 420 or information regarding the repeat number of the reconstruction process, a threshold value that is previously defined by a user, or the like. In addition, the storage 470 may store reconstruction information that is generated whenever the reconstruction process is performed in the reconstructing unit 430.

The user interface 480 is used to receive an overall instruction regarding an X-ray imaging system from an external source. That is, the user interface 480 may be used to interface with the user.

Figure 5:
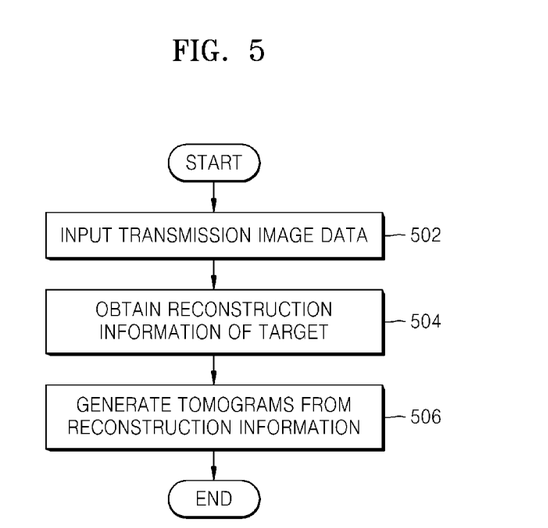
FIG. 5 is a flowchart of a method of reconstructing an image, according to one or more embodiments.

FIG. 5 is a flowchart of a method of reconstructing an image, according to one or more embodiments. The details of the image processing apparatus 400 are applied to the method according to the present embodiments. Details that will be described below with reference to equations are also applied to the image processing apparatus 400.

In operation 502, the input unit 410 of the image processing apparatus 400 receives transmission image data measured by the X-ray imaging apparatus 110. The transmission image data is transmitted to the image processor 420 through the input unit 410 of the image processing apparatus 400.

In operation 504, the image processor 420 of the image processing apparatus 400 generates reconstruction information for generating an image indicating a target, in particular tomograms indicating the target from the transmission image data. In this case, the reconstruction information for reconstructing the tomograms is generated in consideration of the fact that X-rays have a polychromatic spectrum and the target is affected by energy of X-rays transmitted through the target.

In operation 506, when the reconstruction information for reconstructing the tomograms is determined, the image processor 420 of the image processing apparatus 400 generates tomograms from the determined reconstruction information.

Figure 6:
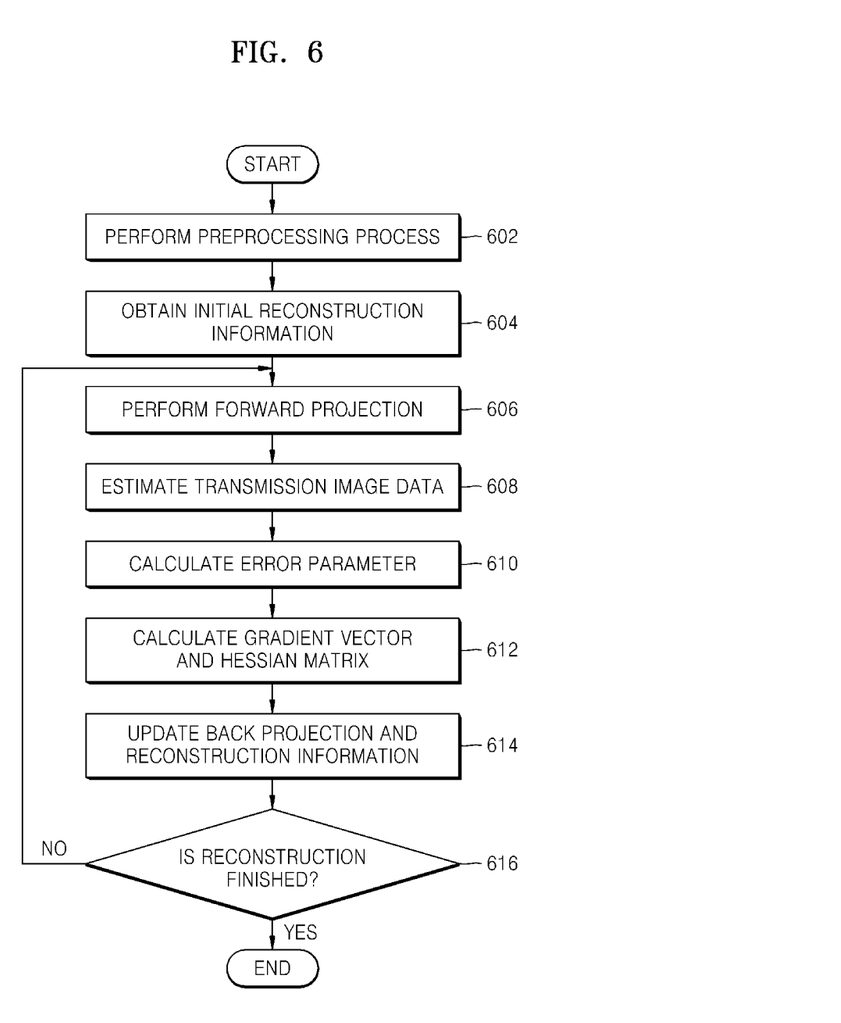
FIG. 6 is a detailed flowchart of an operation of obtaining the reconstruction information of the target of the method of reconstructing an image of FIG. 5.

FIG. 6 is a detailed flowchart of an operation 504 of obtaining the reconstruction information of the target of the method of reconstructing an image of FIG. 5.

In operation 602, the preprocessing unit 425 may perform a basic process for removing noise from the transmission image data that is input to the image processor 420, or may perform processing such as calibration or correction on the transmission image data. These processes may have been previously performed by an imaging apparatus.

The transmission image data input to the image processor 420 may be modeled according to Equation 1 described above. Equation 3 below may be obtained by performing discretization, that is a process of transferring continuous models or equations into discrete counterparts, on Equation 1.

$$y_i = \sum_E S_i(\varepsilon) \exp\left(-\sum_{k=1}^{K} \mu_k(E) l_{i,k}\right) \quad (3)$$
$$= \sum_E S_i(\varepsilon) \exp(-\mu(E)^T l_i)$$

$$\left(\begin{array}{c} \text{where } \mu(E) = [\mu_1(E), \ldots, \mu_K(E)]^T, \\ l_i = [l_1, \ldots, l_k]^T \end{array}\right)$$

Equation 3 may be obtained by approximating an attenuation curve of materials included in the target using linear combination of K basic functions. In Equation 3, $l_{i,k}$ means a line integral of the product of a density value of each of voxels through which an X-ray with a particular wavelength has been transmitted in the target positioned between an $i_{th}$ cell of an X-ray detection unit and an X-ray source and a distance by which the X-ray is transmitted in each of the voxels. This may be expressed according to Equation 4 below.

$$l_{i,k} = [Ax_k]_i = \sum_j a_{i,j} x_{j,k} \quad (4)$$

In Equation 4, i denotes an index of a cell of the X-ray detection unit, j denotes an index of a voxel that is a unit region of the target, and k denotes an index of a material included in the target. Thus, $a_{i,j}$ denotes a distance by which an X-ray having a particular wavelength is transmitted in a $j_{th}$ voxel and $x_{j,k}$ denotes an intensity value of a material k of a $j_{th}$ voxel.

One or more embodiments may also be applied to logarithmic conversion data that is obtained by applying a negative logarithmic value to an equation that is obtained by modeling the transmission image data. Transmission image data $z_i$ to which logarithmic conversion is applied may be expressed according to Equation 5.

$$z_i = -\log\left(\sum_E S_i(E)\exp(-\mu(E)^T l_i)\right) \quad (5)$$

Since radiography uses image data that is obtained by applying a negative logarithmic value to data, a transmission image data model to which logarithmic conversion has been applied may be used.

In operation 604, the initial reconstructing unit 432 obtains initial reconstruction information using transmission image data input to the initial reconstructing unit 432. That is, the initial reconstruction information is first reconstruction information that is formed using the measured transmission image data. As described above, the reconstruction information may be a density value of a material of the target at a predetermined position, that is, a predetermined voxel of the target, which is been indicated by $x_{j,k}$. Such an initial reconstructing process may use a filtered back projection or the like that is well known to those of ordinary skill in the art. Then, a process of forming new reconstruction information based on the reconstruction information is performed and a series of processes for forming new reconstruction information may be repeated.

In operation 606, the forward projection unit 434 may perform forward projection on the reconstruction information. The forward projection is performed in order to consider paths along which X-rays of respective wavelengths are transmitted through a target when a polychromatic X-ray spectrum is radiated to the target that is recognized based on the reconstruction information $x_{j,k}$. A line integral parameter $l_{i,k}$ may be obtained according to Equation 4.

In operation 608, the estimating unit 436 may simulate a case in which an X-ray of a polychromatic spectrum is radiated to the target that is recognized from the reconstruction information to estimate the transmission image data. Transmission image data may be estimated by applying the obtained line integral parameter $l_{i,k}$ to Equation 3 obtained by modeling the transmission image data and the estimated transmission image data may be expressed by $\hat{y}_i$. The transmission image data to which logarithmic conversion is applied may be estimated by applying the line integral parameter $l_{i,k}$ to Equation 5 that is obtained by applying a negative logarithmic value to Equation 3 and the estimated transmission image data may be expressed by $\hat{z}_i$.

In operation 610, the error parameter calculating unit 438 may calculate an error parameter. The error parameter may be previously defined by the user. According to one or more embodiments, the error parameter may be a ratio of the estimated transmission image data to the measured transmission image data or a reciprocal of the ratio. The error parameter is $e_i$ and is defined using Equation 6 below. In this case, $e_i^F$ denotes a forward form of the error parameter and $e_i^R$ denotes a reverse form of the error parameter.

$$e_i^F = \frac{y_i}{\hat{y}_i} \text{ or } e_i^R = \frac{\hat{y}_i}{y_i} \quad (6)$$

An error parameter in a logarithmic domain that is obtained by applying a negative logarithmic value to transmission image data may be expressed in an equation similar to Equation 6 and may be denoted by $d_i$. As described below, the error parameter in a logarithmic domain may be expressed using $d_i^F$ or $d_i^R$ according to Equation 7 below.

$$d_i^F = \frac{z_i}{\hat{z}_i} \text{ or } d_i^R = \frac{\hat{z}_i}{z_i} \quad (7)$$

In operation 612, the optimizing information calculating unit 440 may calculate optimization information used to obtain the reconstruction information. The optimization information may correspond to the Hessian matrix and the gradient vector related to line integral parameters. According to the present embodiments, in order to generate new reconstruction information, the gradient vector and the Hessian matrix are used, which is a result obtained by analyzing an algorithm for obtaining reconstruction information. The algorithm for obtaining reconstruction information will be described below.

As shown in Equation 3, an equation obtained by modeling transmission image data has a complex form obtained by coupling an energy integral and a line integral and thus it is very difficult to obtain the reconstruction information $x_{j,k}$ analytically from the equation. Thus, an inverse problem of a complex model such as Equation 3 may be overcome by defining a cost function instead of directly calculating the reconstruction information $x_{j,k}$. In this case, a cost function may be defined by introducing the GID concept. The GID concept is obtained by generalizing an entropy concept between non-negative vectors and a distance between nonnegative values (for example, $y_i$ and $\hat{y}_i$, or $z_i$ and $\hat{z}_i$) may be defined according to Equation 8 below.

$$\vartheta(y\|\hat{y}) = y \cdot \varphi\left(\frac{y}{\hat{y}}\right) \quad (8)$$

In Equation 8, $\phi(u)$ may satisfy Equation 9 below.

$$\operatorname*{argmin}_u \varphi(u) = 1 \quad (9)$$

Equation 9 illustrates that 'u' for minimizing $\phi(u)$ is 1.

GID may be considered to have a forward form and a reverse form and may be defined according to Equation 10 below.

$$\theta^F(y,\hat{y}) = \theta(y\|\hat{y})$$

$$\theta^R(y,\hat{y}) = \theta(\hat{y}\|y) \quad (10)$$

According to the present embodiment, a radio between the measured transmission image data $y_i$ and the estimated transmission image data $\hat{y}_i$ may be defined as $e_i^F$ or $e_i^R$ according to Equation 6, as described above. A perimeter dependent upon energy may be introduced as below and a marginal sum of the parameter on energy is equal to the estimated transmission image data $\hat{y}_i$.

$$\sum_E e_i^F(E) = \hat{y}_i \qquad (11)$$

An equation obtained by modeling transmission image data with respect to X-rays with a respective energy region, that is, X-rays having respective wavelengths is referred to as $m_i(E)$ and is expressed according to Equation 12 below.

$$m_i(E) = S_i(E)\exp\left(-\sum_k \mu_k(E)l_{i,k}\right) \qquad (12)$$

$e_i^F(E)$ that is not only satisfying Equation 6 but also satisfying Equation 13 as below is simulated.

$$e_i^F(E) = \left(\frac{y_i}{\hat{y}_i}\right) m_i(E) = e_i^F \cdot m_i(E) \qquad (13)$$

In this case, $e_i^F(E)$ may correspond to a distance between a current measured data value and an actual correct answer, for each respective energy band, that is, for each respective wavelength.

Similarly, a parameter for a case of reverse GID is defined according to Equation 14 below.

$$\sum_E e_i^R(E) = y_i \qquad (14)$$

In addition, an equation similar to Equation 13 for a case of forward GID may be expressed according to Equation 15 below.

$$e_i^R(E) = \left(\frac{\hat{y}_i}{y_i}\right) m_i(E) = e_i^R \cdot m_i(E) \qquad (15)$$

With regard to the forward GID, when a parameter $e_i^F(E)$ is used, Equation 10 may be modified to Equation 16 below.

$$\min\sum_i \partial^F(y_i, \hat{y}_i) = \min\sum_{i,E} \partial(e_i^F(E)\|m_i(E)) \qquad (16)$$

With regard to the reverse GID, when a parameter $e_i^R(E)$ is used, Equation 10 may be modified to Equation 17 below.

$$\min\sum_i \partial^F(y_i, \hat{y}_i) = \min\sum_{i,E} \partial(e_i^R(E)\|m_i(E)) \qquad (17)$$

Physically, an added component in a right section of Equation 16 indicates a distance at an energy region E, and an integral of energies is applied to the outermost region of a cost function by defining the cost function according to sum of distances at respective energy regions E.

With regard to data to which logarithmic conversion has been applied, similar equations may be obtained. The equations may be similar to Equation 5 related to $z_i$. In addition, with regard to GID between $z_i$ and $\hat{z}_i$, the equations may be similar to Equation 8. Equations 18 below may be assumed.

$$\sum_E S_i(E) = 1,\ S_i(E) \geq 0 \text{ for all } E \qquad (18)$$

When u is greater than 0, since $-\log(u)$ is convex downwards, Equation 19 below may be satisfied.

$$\begin{aligned}z_i &\leq -\sum_E S_i(E)\log(\exp(-\mu(E)^T l_i)) \\ &= \sum_E S_i(E)\mu(E)^T l_i \\ &= \sum_E t_i(E)\end{aligned} \qquad (19)$$

$d_i^F(E)$ and $d_i^R(E)$ may be defined according to Equations 20 below.

$$\begin{aligned}d_i^F(E) &= \frac{z_i}{\hat{z}_i} t_i(E) \\ d_i^R(E) &= \frac{\hat{z}_i}{z_i} t_i(E)\end{aligned} \qquad (20)$$

Thus, GID with respect to transmission image data to which logarithmic conversion has been applied is expressed according to Equations 21 and 22 below.

$$\begin{aligned}\partial^F(z_i, \hat{z}_i) &= z_i \cdot \varphi\left(\frac{z_i}{\hat{z}_i}\right) \\ &\leq \sum_E d_i^F(E)\varphi\left(\frac{d_i^F(E)}{t_i(E)}\right) \\ &= \sum_E \partial(d_i^F(E)\|t_i(E))\end{aligned} \qquad (21)$$

$$\begin{aligned}\partial^R(z_i, \hat{z}_i) &= \hat{z}_i \cdot \varphi\left(\frac{\hat{z}_i}{z_i}\right) \\ &\leq \sum_E d_i^R(E)\varphi\left(\frac{d_i^R(E)}{t_i(E)}\right) \\ &= \sum_E \partial(d_i^R(E)\|t_i(E))\end{aligned} \qquad (22)$$

Referring back to Equation 16, optimization of a right section of Equation 16 corresponds to double minimization of two parameters $e_i(E)$ and $m_i(E)$. When alternating minimization is used, $e_i(E)$ may be obtained according to Equation 13 or Equation 15. When $\hat{e}_i(E)$ is determined, X may be reconstructed by optimizing $m_i(E)$ with respect to X.

With regard to $\hat{e}_i(E)$, a cost function with respect to a parameter $m_i(E)$ that is obtained by modeling transmission image data with respect to an X-ray with a particular wavelength may be defined according to Equation 23 below.

$$\sum_{i,E} c_i(E, l_i) = \sum_{i,E} \hat{e}_i(E) \varphi\left(\frac{\hat{e}_i(E)}{S_i(E)\exp\left(-\sum_k \mu_k(E)l_{i,k}\right)}\right) \quad (23)$$

That is, when bivariate double minimization is used, the cost function may be defined by the sum of a distance between a cell i of an X-ray detection unit and an energy E, that is, the sum of $c_i(E,l_i)$. A relationship between $x_k$ to be reconstructed and $l_{i,k}$ may satisfy Equation 4. A surrogate function related to $l_{i,k}$ may be considered, instead of minimizing Equation 23 with respect to $x_k$ directly, and may be defined according to Equation 24 below.

$$c_i(E,l_i) \le q_i(E,l_i;\hat{l}_i) = c_i(E,\hat{l}_i) + g_i(E,\hat{l}_i)^T(l_i-\hat{l}_i) + \tfrac{1}{2}(l_i-\hat{l}_i)^T H_i(E,\hat{l}_i)(l_i-\hat{l}_i) \quad (24)$$

When $q_i(\bullet)$ that is a surrogate function is greater than $c_i(\bullet)$ that is an original cost function, for all $l_i$, an algorithm for reducing cost monotonically may be obtained by minimizing the surrogate function. When a function obtained by performing a marginal sum on a function $f(E,\bullet)$ dependent upon energy is denoted by $f^\epsilon(\bullet)$, a cost function obtained by performing integral with respect to energy on the cost function that has been obtained so far may be defined according to Equation 25 below.

$$\sum_{i,E} q_i(E, l_i; \hat{l}_i) = \sum_i q_i^\epsilon(l_i; \hat{l}_i) \quad (25)$$

$$= c_i^\epsilon(\hat{l}_i) + g_i^\epsilon(\hat{l}_i)^T(l_i - \hat{l}_i) + \frac{1}{2}(l_i - \hat{l}_i)^T H_i^\epsilon(\hat{l}_i)(l_i - \hat{l}_i)$$

Equation 25 is a quadratic equation regarding a parameter $l_i$ related to an unknown value. A term dependent upon energy is modified to a constant that is used as a coefficient included in the quadratic equation. That is, a cost function $$\sum_i q_i^\epsilon(\cdot)$$

is obtained by decoupling integral and line integral of energies. Since the form of Equation 25 is the same as an equation for obtaining a surrogate function when transmission image data with respect to an X-ray with a particular wavelength is monochromatic-modeled, Equation 25 may be solved by using known methods of obtaining a line integral.

Optimization of Equation 25 may be obtained as optimization with respect to respective voxels in consideration of a fact that $q_i^\epsilon(l_i)$ is convex. That is, an obtained surrogate function may be obtained as a separate surrogate function (SSF). Equation 26 below may be obviously satisfied.

$$l_i = [Ax]_i = \sum_j a_{i,j} x_j = \sum_j \alpha_{i,j}\left(\frac{a_{i,j}}{\alpha_{i,j}}(x_j - \hat{x}_j) + \hat{l}_i\right) \quad (26)$$

$$\left(\text{where } x_j = [x_{j,1}, \ldots, x_{j,K}]^T, \sum_j \alpha_{i,j} = 1, \alpha_{i,j} \ge 0\right)$$

In this case, is $q_i^\epsilon(l_i)$ is convex with respect to $l_i$, Inequality 27 below may be satisfied.

$$\sum_i q_i^\epsilon(l_i; \hat{l}_i) \le \sum_{i,j} \alpha_{i,j} q_i^\epsilon\left(\frac{a_{i,j}}{\alpha_{i,j}}(x_j - \hat{x}_j) + \hat{l}_i; \hat{l}_i\right) \quad (27)$$

In Inequality 27, $\alpha$ is defined according to Equation 28 below.

$$\alpha_{i,j} = \frac{a_{i,j}}{\sum_j a_{i,j}} = \frac{a_{i,j}}{\gamma_i} \quad (28)$$

$x_j$ is updated by using a Newton's method according to Equation 29 below.

$$x_j = \hat{x}_j - \left(\sum_i a_{i,j} \gamma_i H_i^\epsilon(\hat{l}_i)\right)^{-1}\left(\sum_i a_{i,j} g_i^\epsilon(\hat{l}_i)\right) \quad (29)$$

In Equation $$\sum_i a_{i,j} g(\cdot)$$

means vectors obtained by back projecting respective elements of a vector $g(\bullet)$ and $$\sum_i a_{i,j} H(\cdot)$$

means matrixes obtained by back projecting respective elements of a matrix $H(\bullet)$ If $c_i^\epsilon(\bullet) \le q_i^\epsilon(\bullet)$ that is a monotone decreasing condition is alleviated, $q_i^\epsilon(\bullet)$ may be obtained by quadratic approximation of the original cost function. That is, a minimization algorithm may be obtained by repeatedly performing quadratic approximation on the original cost function. In this case, in Equation 25, $g_i^\epsilon(\hat{l}_i)$ and $H_i^\epsilon(\hat{l}_i)$ may correspond to a gradient vector and a Hessian matrix of the original cost function. When it is assumed that $\phi(u)$ is capable of being differentiated two times, the gradient vector $g_i^\epsilon(\hat{l}_i)$ and the Hessian matrix $H_i^\epsilon(\hat{l}_i)$ may be expressed according to Equations 30 and 31 below, respectively.

$$g_i^\epsilon(\hat{l}_i) = \frac{\partial c_i}{\partial l_i}\bigg|_{l_i=\hat{l}_i} = \sum_E e_i^2 \varphi'(e_i) \hat{m}_i(E) \mu(E) \quad (30)$$

$$H_i^\epsilon(\hat{l}_i) = \frac{\partial^2 c_i}{\partial l_i^2}\bigg|_{l_i=\hat{l}_i} = \sum_E (e_i^3 \varphi''(e_i) + e_i^2 \varphi'(e_i)) \hat{m}_i(E) \mu(E) \mu(E)^T \quad (31)$$

In Equation 31, $e_i$ is defined in Equation 6, $e_i(E)$ is defined in Equation 13 or Equation 15, and $m_i(E)$ is defined in Equation 12.

Data to which logarithmic conversion has been applied is obtained in the same manner as the above-described algorithm. With regard to the data to which logarithmic conversion has been applied, a gradient vector and a Hessian matrix are defined according to Equations 32 and 33, respectively.

$$g_i^\varepsilon(\hat{l}_i) = \frac{\partial c_i}{\partial l_i}\bigg|_{l_i=\hat{l}_i} = \sum_E d_i^2 \varphi'(d_i)\hat{t}_i(E)\mu(E) \quad (32)$$

$$H_i^\varepsilon(\hat{l}_i) = \frac{\partial^2 c_i}{\partial l_i^2}\bigg|_{l_i=\hat{l}_i} = \sum_E (d_i^3 \varphi''(d_i) + d_i^2 \varphi'(d_i))\hat{t}_i(E)\mu(E)\mu(E)^T \quad (33)$$

In Equations 32 and 33, $d_i$ is defined according to Equation 7, $d_i(E)$ is defined according to Equation 20, and $t_i(E)$ is defined according to Equation 19.

$\phi(u)$ that is used in the gradient vector $g_i^\varepsilon(\hat{l}_i)$ and the Hessian matrix $H_i^\varepsilon(\hat{l}_i)$ may have various forms. Four types of $\phi(u)$ below may be used.

$$\varphi(u) = u^\beta + \frac{\alpha}{\beta}u^{-\beta}, \quad (34)$$

$$\varphi(u) = \log(u) + \frac{1}{\beta}u^{-\beta},$$

$$\varphi(u) = \frac{1}{\beta}u^\beta - \log(u),$$

$$\varphi(u) = \frac{1}{\beta(\beta-1)}(u^\beta - u) + \frac{1}{\beta}(1-u),$$

where $\alpha, \beta \geq 0$

A final result of the above-described algorithm for obtaining reconstruction information is expressed in Equation 29 which shows a relationship between previous reconstruction information $\hat{X}_j$ and new updated reconstruction information $x_j$. As shown in Equation 29, the new updated reconstruction information $x_j$ is generated by obtaining a gradient vector $g_i^\varepsilon(\hat{l}_i)$ and a Hessian matrix $H_i^\varepsilon(\hat{l}_i)$ and performing a predetermining calculation process. The optimizing information calculating unit 440 uses an error parameter and a line integral parameter that are calculated in a previous process for obtaining the gradient vector $g_i^\varepsilon(\hat{l}_i)$ and the Hessian matrix $H_i^\varepsilon(\hat{l}_i)$. Other data required for the calculation is obtained from the storage 470 and is used to calculated optimization information.

In operation 614, the back projection and update unit 442 generates new reconstruction information according to Equation 29. The back projection and update unit 442 receives the gradient vector $g_i^\varepsilon(\hat{l}_i)$ and the Hessian matrix $H_i^\varepsilon(\hat{l}_i)$, which are calculated by the optimizing information calculating unit 440, receives the reconstruction information from the storage 470, and performs a predetermined calculation process. First, a first vector may be generated by back projecting elements of the gradient vector and a first matrix is generated by back projecting elements of the Hessian matrix. Then, the new reconstruction information may be obtained by calculating linear summation of the previous reconstruction information and a value obtained by the product of an inverse matrix of the first matrix and the first vector. The generated new reconstruction information is updated as reconstruction information.

In operation 616, the determination unit 444 may determine whether a process for obtaining the new reconstruction information is further performed. A criterion for the determination may be a repeat number of the reconstruction process, which is previously determined by a user and a data amount difference between the updated reconstruction information and the previous reconstruction information. When reconstruction information that has been reconstructed so far is not appropriate, the determination unit 444 performs a new process for generating reconstruction information again. In this case, the determination unit 444 uses the reconstruction information that has been reconstructed so far. When the determination unit 444 does not finish a reconstruction process, operation 606 of performing forward projection is performed. When the determination unit 444 finishes the reconstruction process, the lastly updated reconstruction information is used as reconstruction information to reconstruct tomograms indicating the target.

Thus far, a case of a single polychromatic X-ray spectrum has been described for convenience of description. However, the above details may also be applied to a case of a plurality of X-rays having a plurality of spectrums. When an index of each of the spectrums is 's', if the index 's' is added to the above-described equations, it is considered that there are a plurality of spectrums. For example, with regard to a plurality of spectrums, Equation 29 for obtaining new reconstruction information may be modified to Equations 35 and 36 below.

$$g_{j,s}^\varepsilon = \sum_i a_{i,j,s} g_{i,s}^\varepsilon(\hat{l}_{i,s}) \quad (35)$$

$$g_j^\varepsilon = \sum_s g_{j,s}^\varepsilon \quad (36)$$

Also in Equation 29, back projection is performed to elements of the gradient vector. Equation 35 shows that a back projected vector corresponding to any one spectrum from among a plurality of spectrums is generated. Equation 36 shows a process of adding back projected vectors corresponding to each of the spectrums. As a result, a single vector $g_j^\varepsilon$ is generated in consideration of a plurality of spectrums according to Equation 36.

$$H_{j,s}^\varepsilon = \sum_i a_{i,j,s} \gamma_{i,s} H_{i,s}^\varepsilon(\hat{l}_{i,s}) \quad (37)$$

$$H_j^\varepsilon = \sum_s H_{j,s}^\varepsilon \quad (38)$$

Also in Equation 29, elements of the Hessian matrix are back projected. Equation 37 shows that a back projected matrix corresponding to any one spectrum from among spectrums is generated. Equation 38 shows a process of adding back projected vectors corresponding to each of the spectrums. As a result, a single matrix $H_j^\varepsilon$ is generated in consideration of a plurality of spectrums according to Equation 38.

Then, new reconstruction information may be generated using $g_j^\varepsilon$ and $H_j^\varepsilon$ according to Equation 39 below.

$$x_j = \hat{X}_j - (H_j^\varepsilon)^{-1}(g_j^\varepsilon) \quad (39)$$

Equation 39 for generating reconstruction information in consideration of a plurality of spectrums uses a Newton's Method, like in Equation 29 for generating reconstruction information in consideration of a single spectrum. As a result, even if there is a plurality of spectrums, an overall flow or a structure of an algorithm is not different from a case of a single spectrum. Like in Equations 36 and 38, only a process in which a plurality of spectrums are considered needs to be considered.

The embodiments of the method of reconstructing tomograms from a polychromatic X-ray transmission image can be written as computer programs and can be implemented in general-use digital computers that execute the programs using a non-transitory computer readable recording medium.

Examples of the non-transitory computer-readable recording medium include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a controller such as a dedicated processor unique to that unit or by a processor common to one or more of the modules. The described methods may be executed on a general purpose computer or processor or may be executed on a particular machine such as the apparatus for processing an, image described herein.

As described above, according to the one or more of the above embodiments, an image of a target is reconstructed in consideration of a fact that an X-ray has a polychromatic X-ray spectrum and the target is dependent upon energy of the X-ray transmitted through the target, and thus an image without any beam hardening artifacts may be generated. In addition, measurement data for X-rays with respect to all wavelengths is used to reconstruct an image, there by reconstructing an accurate image.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A method of reconstructing tomograms, in which at least one X-ray spectrum is radiated to a target comprising at least one material in order to reconstruct the tomograms of the target from an X-ray transmitted through the target, the method comprising:
   receiving transmission image data that is measured by detecting the X-ray transmitted through the target;
   obtaining first reconstruction information from the measured transmission image data;
   estimating transmission image data from the obtained first reconstruction information in consideration of a fact that the X-ray has a polychromatic X-ray spectrum;
   obtaining second reconstruction information from the estimated transmission image data; and
   generating the tomograms of the target from the obtained second reconstruction information,
   wherein the second reconstruction information is obtained based on a minimization of a cost function defined by introducing a generalized information theoretic discrepancy (GID) concept with respect to the measured transmission image data and estimated transmission image data.

2. The method of claim 1, wherein the second reconstruction information corresponds to a density value of a material composing the target at a predetermined position of the target.

3. The method of claim 1, wherein the obtaining of the first reconstruction information uses a filtered back projection method.

4. The method of claim 1, wherein the estimating comprises:

calculating a line integral parameter related to the first reconstruction information in consideration of a path along which an X-ray of respective wavelength of the polychromatic X-ray spectrum is transmitted through the target; and estimating the transmission image data by using the calculated line integral parameter.

5. The method of claim 4, wherein the obtaining of the second reconstruction information comprises:

calculating an error parameter based on the estimated transmission image data and the measured transmission image data;

obtaining a gradient vector and a Hessian matrix of the line integral parameter, based on the error parameter and the line integral parameter; and calculating the second reconstruction information using the gradient vector and the Hessian matrix of the line integral parameter.

6. The method of claim 5, wherein the error parameter is a ratio of the estimated transmission image data to the measured transmission image data or a reciprocal of the ratio.

7. The method of claim 5, wherein the error parameter is a ratio of a negative logarithmic value of the estimated transmission image data to a negative logarithmic value of the measured transmission image data or a reciprocal of the ratio.

8. The method of claim 5, wherein the gradient vector of the line integral parameter is calculated according to an equation below:

$$\sum_E e_{i,s}^2 \varphi'(e_{i,s}) \hat{m}_{i,s}(E) \mu(E),$$

where i denotes an index of a unit cell with a predetermined size of the X-ray detection unit, s denotes an index of an X-ray spectrum, $e_{i,s}$ denotes an error parameter based on the estimated transmission image data and the measured transmission image data, φ(u) denotes a predetermined function satisfying $$\operatorname{argmin}_u \varphi(u) = 1,$$

and φ'(u) denotes a function that is first-order differentiated, wherein $\hat{m}_{i,s}(E)$ is obtained by modeling transmission image data when a monochromatic X-ray is transmitted through the target and is expressed according to an equation below:

$$\hat{m}_{i,s}(E) = S_{i,s}(E) \exp\left(-\sum_k \mu_k(E) \hat{l}_{i,s,k}\right),$$

where μ(E) denotes an attenuation coefficient curve, $\hat{l}_{i,s,k}$ denotes the line integral parameter, and $S_{i,s}(E)$ denotes an intensity of a radiated X-ray with a predetermined wavelength.

9. The method of claim 5, wherein the gradient vector of the line integral parameter is calculated according to an equation below:

$$\sum_E d_{i,s}^2 \varphi'(d_{i,s}) \hat{t}_{i,s}(E) \mu(E),$$

where i denotes an index of a unit cell with a predetermined size of the X-ray detection unit, s denotes an index of an X-ray spectrum, $d_{i,s}$ denotes an error parameter based on a value obtained by applying a negative logarithmic value to the estimated transmission image data and a value obtained by applying a negative logarithmic value to the measured transmission image data, φ(u) denotes a predetermined function satisfying $$\operatorname*{argmin}_u \varphi(u) = 1,$$

and φ'(u) denotes a function that is first-order differentiated, wherein $\hat{t}_{i,s}(E) = S_{i,s}(E) \mu(E)^T \hat{l}_{i,s}$ is satisfied, wherein μ(E) denotes an attenuation coefficient curve, $\hat{l}_{i,s}$ denotes the line integral parameter, and $S_{i,s}(E)$ denotes an intensity of a radiated X-ray with a predetermined wavelength.

10. The method of claim 5, wherein the Hessian matrix of the line integral parameter is calculated according to an equation below:

$$\sum_E (e_{i,s}^3 \varphi''(e_{i,s}) + e_{i,s}^2 \varphi'(e_{i,s})) \hat{m}_{i,s}(E) \mu(E) \mu(E)^T$$

where i denotes an index of a unit cell with a predetermined size of the X-ray detection unit, s denotes an index of an X-ray spectrum, $e_{i,s}$ denotes an error parameter based on the estimated transmission image data and the measured transmission image data, φ(u) denotes a predetermined function satisfying $$\operatorname*{argmin}_u \varphi(u) = 1,$$

φ'(u) denotes a function that is first-order differentiated, and φ''(u) denotes a function that is second-order differentiated,
wherein $\hat{m}_{i,s}(E)$ is obtained by modeling transmission image data when a monochromatic X-ray is transmitted through the target and is expressed according to an equation below:

$$\hat{m}_{i,s}(E) = S_{i,s}(E) \exp\left(-\sum_k \mu_k(E) \hat{l}_{i,s,k}\right),$$

μ(E) denotes an attenuation coefficient curve, $\hat{l}_{i,s,k}$ denotes the line integral parameter, and $S_{i,s}(E)$ denotes an intensity of a radiated X-ray with a predetermined wavelength.

11. The method of claim 5, wherein the Hessian matrix of the line integral parameter is calculated according to an equation below:

$$\sum_E (d_{i,s}^3 \varphi''(d_{i,s}) + d_{i,s}^2 \varphi'(d_{i,s})) \hat{t}_{i,s}(E) \mu(E) \mu(E)^T$$

where i denotes an index of a unit cell with a predetermined size of the X-ray detection unit, s denotes an index of an X-ray spectrum, $d_{i,s}$ denotes an error parameter based on a value obtained by applying a negative logarithmic value to the estimated transmission image data and a value obtained by applying a negative logarithmic value to the measured transmission image data, φ(u) denotes a predetermined function satisfying $$\operatorname*{argmin}_u \varphi(u) = 1,$$

φ'(u) denotes a function that is first-order differentiated, and φ''(u) denotes a function that is second-order differentiated,
wherein $\hat{t}_{i,s}(E) = S_{i,s}(E) \mu(E)^T \hat{l}_{i,s}$ is satisfied, wherein μ(E) denotes an attenuation coefficient curve, $\hat{l}_{i,s}$ denotes the line integral parameter, and $S_{i,s}(E)$ denotes an intensity of a radiated X-ray with a predetermined wavelength.

12. The method of claim 5, wherein the calculating of the second reconstruction information comprises:
  generating a first vector by generating vectors corresponding to the gradient vectors by back projecting elements of the gradient vectors corresponding to respective spectrums and adding the generated vectors;
  generating a first matrix by generating matrixes corresponding to the Hessian matrix by back projecting elements of the Hessian matrix corresponding to respective spectrums and adding the generated matrixes; and
  generating second reconstruction information by calculating linear summation of the first reconstruction information and product of an inverse matrix of the first matrix and the first vector.

13. The method of claim 1, wherein the estimating of the transmission image data and the obtaining of the second reconstruction information are repeated a predetermined number of times by using the obtained second reconstruction information instead of the first reconstruction information used in the estimating of the transmission image data.

14. The method of claim 8, wherein φ(u) is any one of equations below:

$$\varphi(u) = u^\alpha + \frac{\alpha}{\beta} u^{-\beta},$$

$$\varphi(u) = \log(u) + \frac{1}{\beta} u^{-\beta},$$

$$\varphi(u) = \frac{1}{\beta} u^\beta - \log(u),$$

$$\varphi(u) = \frac{1}{\beta(\beta-1)} (u^\beta - u) + \frac{1}{\beta}(1 - u).,$$

where α and β are equal to or greater than 0.

15. The method of claim 9, wherein φ(u) is any one of equations below:

$$\varphi(u) = u^\alpha + \frac{\alpha}{\beta} u^{-\beta},$$

-continued $$\varphi(u) = \log(u) + \frac{1}{\beta}u^{-\beta},$$

$$\varphi(u) = \frac{1}{\beta}u^{\beta} - \log(u),$$

$$\varphi(u) = \frac{1}{\beta(\beta-1)}(u^{\beta} - u) + \frac{1}{\beta}(1 - u).,$$

where α and β are equal to or greater than 0.

16. The method of claim 10, wherein φ(u) is any one of equations below:

$$\varphi(u) = u^{\alpha} + \frac{\alpha}{\beta}u^{-\beta},$$

$$\varphi(u) = \log(u) + \frac{1}{\beta}u^{-\beta},$$

$$\varphi(u) = \frac{1}{\beta}u^{\beta} - \log(u),$$

$$\varphi(u) = \frac{1}{\beta(\beta-1)}(u^{\beta} - u) + \frac{1}{\beta}(1 - u).$$

where α and β are equal to or greater than 0.

17. The method of claim 11, wherein φ(u) is any one of equations below:

$$\varphi(u) = u^{\alpha} + \frac{\alpha}{\beta}u^{-\beta},$$

$$\varphi(u) = \log(u) + \frac{1}{\beta}u^{-\beta},$$

$$\varphi(u) = \frac{1}{\beta}u^{\beta} - \log(u),$$

$$\varphi(u) = \frac{1}{\beta(\beta-1)}(u^{\beta} - u) + \frac{1}{\beta}(1 - u).,$$

where α and β are equal to or greater than 0.

18. The method of claim 1, wherein the obtaining of the second reconstruction information comprises:

obtaining a surrogate function of the cost function by decoupling an integral of energies of the at least one X-ray spectrum and a line integral of a path along which photons of the at least one X-ray spectrum are radiated; and minimizing the surrogate function having the decoupled form in order to calculate the second reconstruction information of the target.

19. The method of claim 18, wherein the surrogate function is obtained by setting two appropriate hypothetical parameters, redefining the cost function in a form of a double minimization related to the two hypothetical parameters, and performing an alternating minimization method related to the two hypothetical parameters on the redefined cost function.

20. A non-transitory computer readable recording medium having recorded thereon a program for executing the method of claim 1.

21. An apparatus for processing an image, in which at least one X-ray spectrum is radiated to a target comprising at least one material in order to reconstruct tomograms of the target from an X-ray transmitted through the target, the apparatus comprising:

an input unit for receiving transmission image data that is measured by detecting the X-ray transmitted through the target;

an image processor for obtaining first reconstruction information from the measured transmission image data, estimating transmission image data from the obtained first reconstruction information in consideration of a fact that the X-ray has a polychromatic X-ray spectrum, obtaining second reconstruction information from the estimated transmission image data, and for generating the tomograms of the target from the second obtained reconstruction information; and an output unit for outputting the tomograms to an image display apparatus connected to the apparatus, wherein the second reconstruction information is obtained based on a minimization of a cost function defined by introducing a generalized information theoretic discrepancy (GID) concept with respect to the measured transmission image data and estimated transmission image data.

* * * * *

UNITED STATES PATENT AND TRADEMARK OFFICE
CERTIFICATE OF CORRECTION

PATENT NO. : 8,958,619 B2
APPLICATION NO. : 13/553033
DATED : February 17, 2015
INVENTOR(S) : Kwang-eun Jang et al.

It is certified that error appears in the above-identified patent and that said Letters Patent is hereby corrected as shown below:

Claims

Claim 14, Column 20, Line 57-59 (Approximately)

Delete " $\varphi(u) = \frac{1}{\beta(\beta-1)}(u^\beta - u) + \frac{1}{\beta}(1-u).$,"

and insert -- $\varphi(u) = \frac{1}{\beta(\beta-1)}(u^\beta - u) + \frac{1}{\beta}(1-u).$ --, therefor.

Claim 15, Column 21, Line 6-8 (Approximately)

Delete " $\varphi(u) = \frac{1}{\beta(\beta-1)}(u^\beta - u) + \frac{1}{\beta}(1-u).$,"

and insert -- $\varphi(u) = \frac{1}{\beta(\beta-1)}(u^\beta - u) + \frac{1}{\beta}(1-u).$ --, therefor.

Claim 16, Column 21, Line 22-24 (Approximately)

Delete " $\varphi(u) = \frac{1}{\beta(\beta-1)}(u^\beta - u) + \frac{1}{\beta}(1-u).$,"

and insert -- $\varphi(u) = \frac{1}{\beta(\beta-1)}(u^\beta - u) + \frac{1}{\beta}(1-u).$ --, therefor.

Claim 17, Column 21, Line 37-39 (Approximately)

Delete " $\varphi(u) = \frac{1}{\beta(\beta-1)}(u^\beta - u) + \frac{1}{\beta}(1-u).$,"

and insert -- $\varphi(u) = \frac{1}{\beta(\beta-1)}(u^\beta - u) + \frac{1}{\beta}(1-u).$ --, therefor.

Signed and Sealed this
Twentieth Day of October, 2015

Michelle K. Lee
*Director of the United States Patent and Trademark Office*